US012122595B2

(12) United States Patent
Giacobbe

(10) Patent No.: US 12,122,595 B2
(45) Date of Patent: Oct. 22, 2024

(54) GUIDED TRASH CAN CART ASSEMBLY

(71) Applicant: Dominick Giacobbe, Carlsbad, CA (US)

(72) Inventor: Dominick Giacobbe, Carlsbad, CA (US)

( * ) Notice: Subject to any disclaimer, the term of this patent is extended or adjusted under 35 U.S.C. 154(b) by 238 days.

(21) Appl. No.: 17/832,598

(22) Filed: Jun. 4, 2022

(65) Prior Publication Data

US 2023/0391546 A1 Dec. 7, 2023

(51) Int. Cl.

*B65F 1/14* (2006.01)
*A47G 29/14* (2006.01)
*A47G 29/30* (2006.01)
*B65F 1/00* (2006.01)
*B65F 3/02* (2006.01)

(52) U.S. Cl.

CPC .............. *B65F 3/02* (2013.01); *A47G 29/141* (2013.01); *A47G 29/30* (2013.01); *B65F 1/0053* (2013.01); *B65F 1/1473* (2013.01); *A47G 2029/147* (2013.01); *B65F 2003/0246* (2013.01); *B65F 2003/025* (2013.01); *B65F 2210/139* (2013.01); *B65F 2210/165* (2013.01)

(58) Field of Classification Search

CPC ........ B65F 3/02; B65F 1/0053; B65F 1/1473; B65F 2003/0246; B65F 2003/025; B65F 2210/139; B65F 2210/165; B65F 2210/128; B65F 1/1468; B65F 2210/168; B65F 2210/172; A47G 29/141; A47G 29/30; A47G 2029/147

See application file for complete search history.

(56) References Cited

U.S. PATENT DOCUMENTS

| | | | | |
|---|---|---|---|---|
| D477,900 | S | 7/2003 | Ditmars, Jr. | |
| 8,146,695 | B1 | 4/2012 | Ramshur | |
| 9,908,695 | B1 | 3/2018 | Thompson | |
| 10,046,910 | B2 | 8/2018 | Wagner | |
| 10,286,558 | B1 * | 5/2019 | Asada | B25J 13/003 |
| 10,625,934 | B2 | 4/2020 | Mallady | |
| 10,857,925 | B1 * | 12/2020 | Sahota | G05D 1/0011 |
| 2018/0079591 | A1 | 3/2018 | Doty | |
| 2019/0106144 | A1 * | 4/2019 | McCall | B62D 1/283 |
| 2022/0363472 | A1 * | 11/2022 | Mutua | B25J 11/008 |
| 2023/0312026 | A1 * | 10/2023 | Zeamer | B65F 3/02 |
| 2023/0363562 | A1 * | 11/2023 | O'Toole | G06K 7/1417 |
| 2023/0373715 | A1 * | 11/2023 | Tank, Jr. | B65F 1/163 |

FOREIGN PATENT DOCUMENTS

WO WO2020108658 6/2020

* cited by examiner

*Primary Examiner* — Lynn E Schwenning
*Assistant Examiner* — Lucia Elba Rodriguez

(57) ABSTRACT

A guided trash can cart assembly for automatically transporting a garbage can to a pick up location includes a cart that has a pair of tracks on each side of the cart to drive the cart along a support surface. A dump box is hingedly integrated into the cart to receive a package delivery. An actuator is integrated into the cart and the actuator urges the dump box into a dumping position and a lowered position. An engagement element is integrated into the cart. A garbage can is provided and the engagement element releasably engages the garbage can. In this way the cart can transport the garbage can to a predetermined location.

13 Claims, 7 Drawing Sheets

GUIDED TRASH CAN CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to guided cart devices and more particularly pertains to a new guided cart device for automatically transporting a garbage can to a pickup location. The device includes a robotic cart with tracks and an engagement element in the robotic cart. The robotic cart is in wireless communication with a personal electronic device for programming routes and schedules into the cart. The robotic cart includes a dump box for receiving a package delivery and subsequently dumping the package delivery in a secure location. The device includes a garbage can which can be releasably engaged by the engagement element for transporting the garbage can with the robotic cart.

(2) Description of Related Art Including Information Disclosed Under 37 CFR 1.97 and 1.98

The prior art relates to guided cart devices including a motorized cart which follows a buried guide wire. The prior art discloses a variety of robotic carts which has a well integrated into the robotic carts for transporting a garbage receptacle. The prior art discloses a variety of motorized carts that includes a pair of drive wheels and an arm that engages a trash can for transporting the trash can. The prior art discloses an autonomous wagon that can carry trash bags along a pre-determined route.

BRIEF SUMMARY OF THE INVENTION

An embodiment of the disclosure meets the needs presented above by generally comprising a cart that has a pair of tracks on each side of the cart to drive the cart along a support surface. A dump box is hingedly integrated into the cart to receive a package delivery. An actuator is integrated into the cart and the actuator urges the dump box into a dumping position and a lowered position. An engagement element is integrated into the cart. A garbage can is provided and the engagement element releasably engages the garbage can. In this way the cart can transport the garbage can to a predetermined location.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
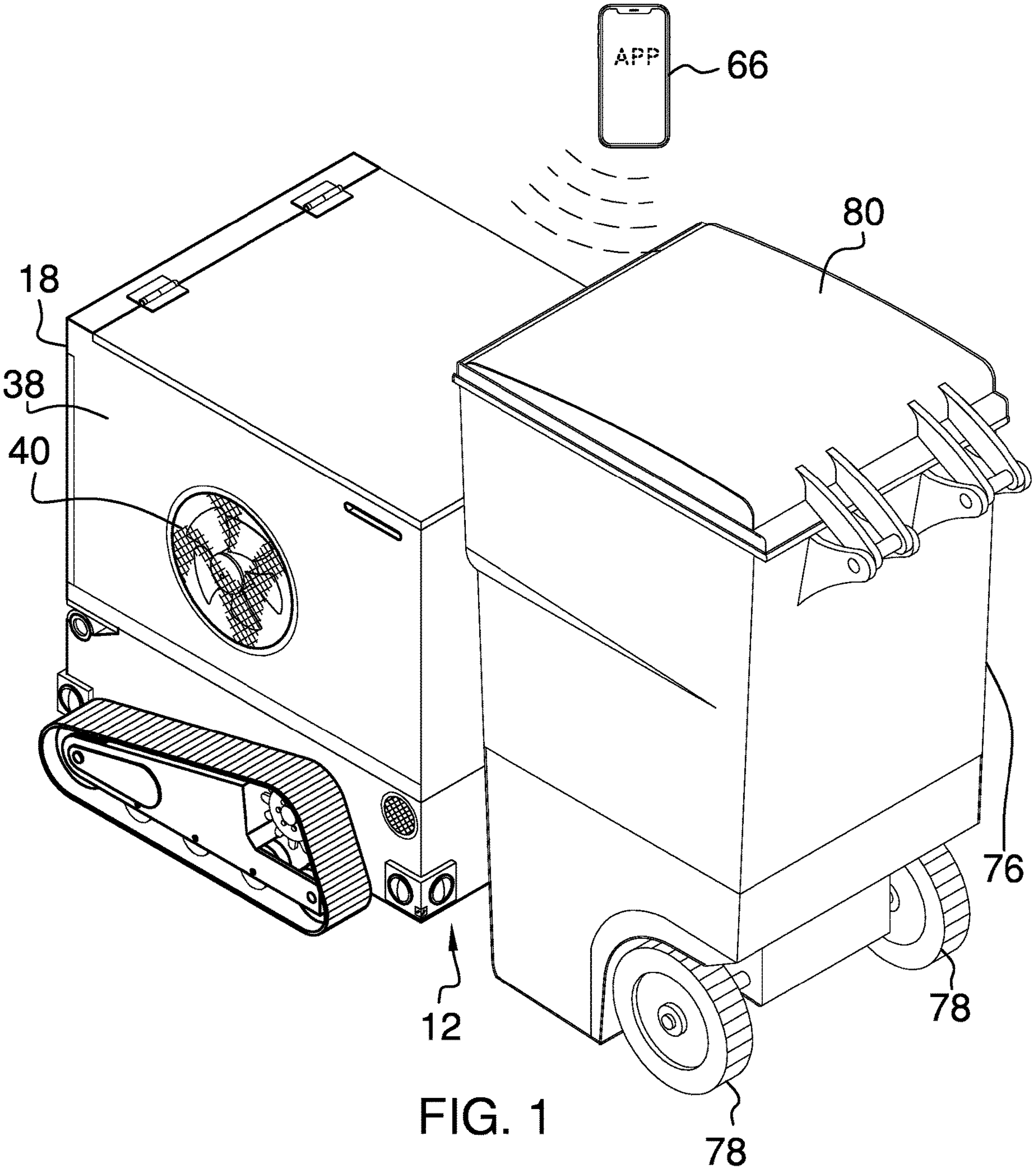
FIG. 1 is a perspective view of a guided trash can cart assembly according to an embodiment of the disclosure.
Figure 2:
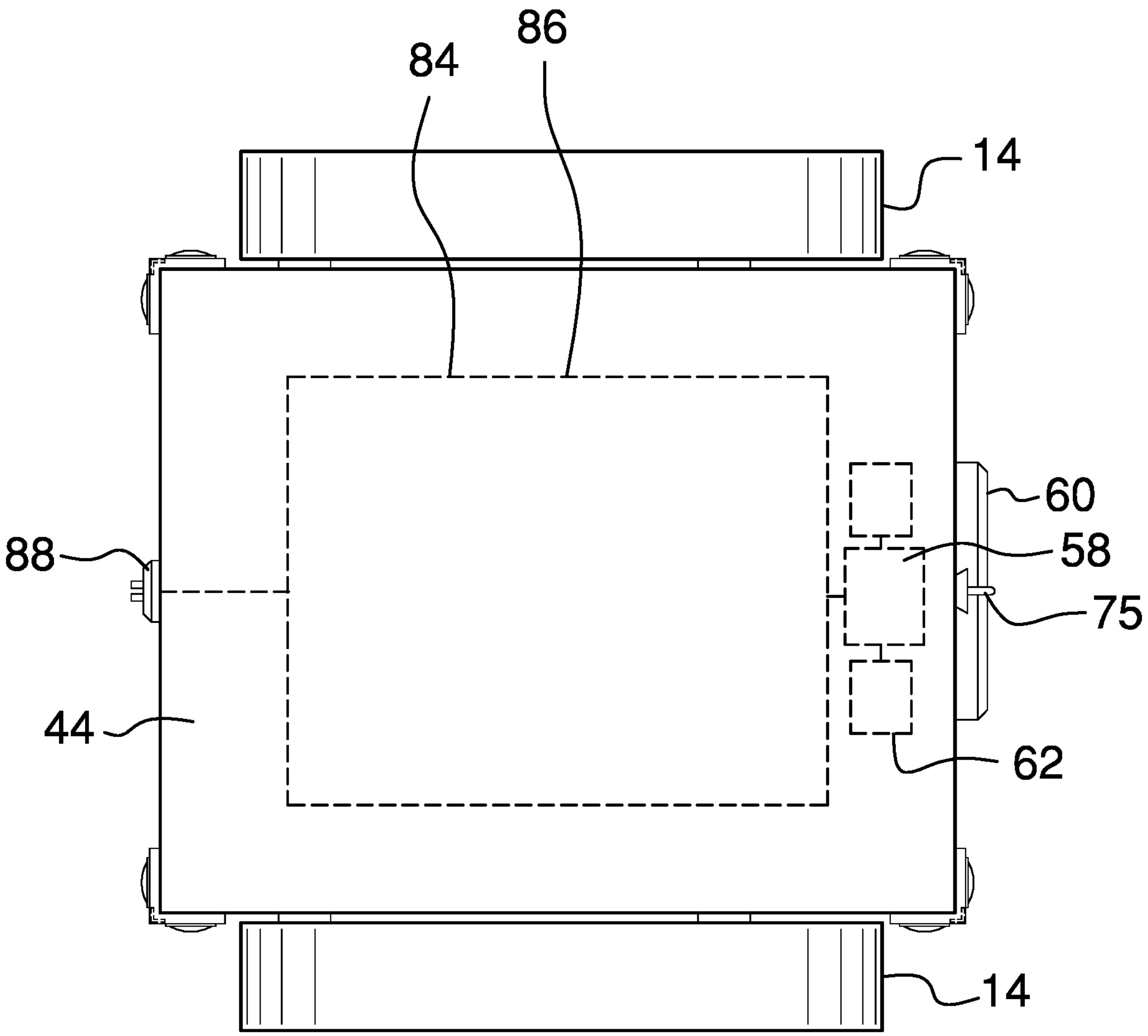
FIG. 2 is a top phantom view of a cart of an embodiment of the disclosure.
Figure 3:
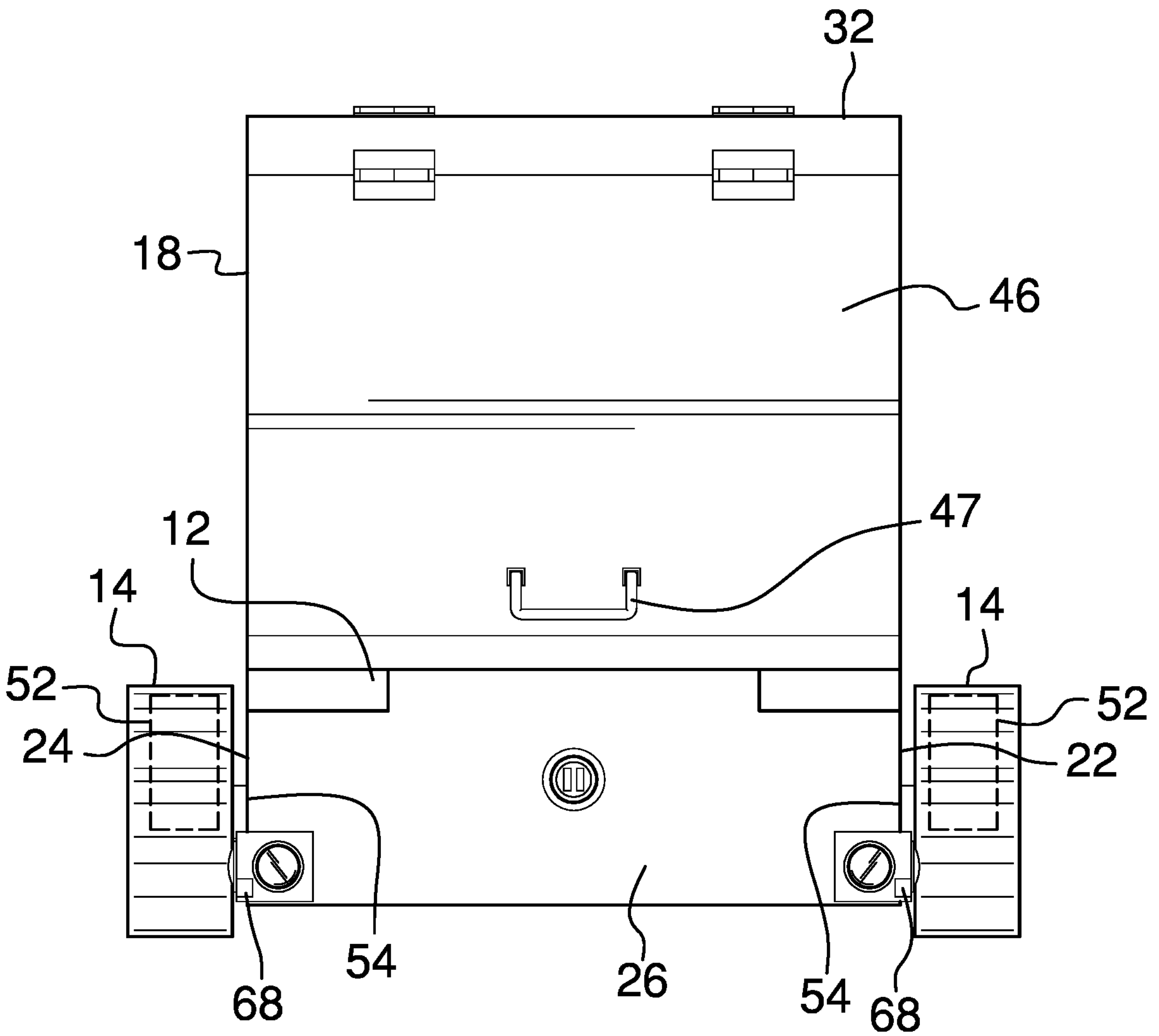
FIG. 3 is a front view of a cart of an embodiment of the disclosure.
Figure 4:
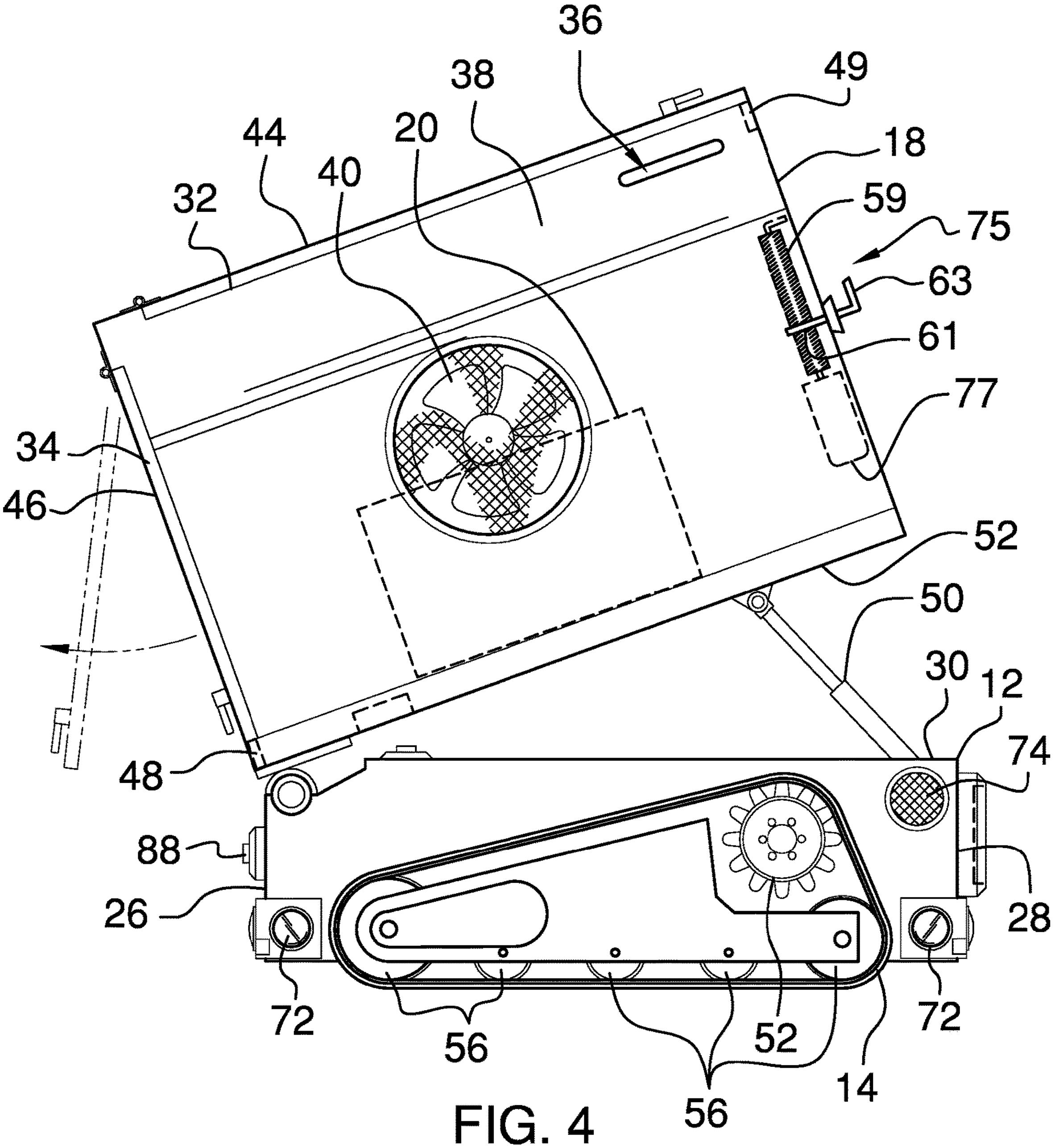
FIG. 4 is a left side view of a cart of an embodiment of the disclosure.
Figure 5:
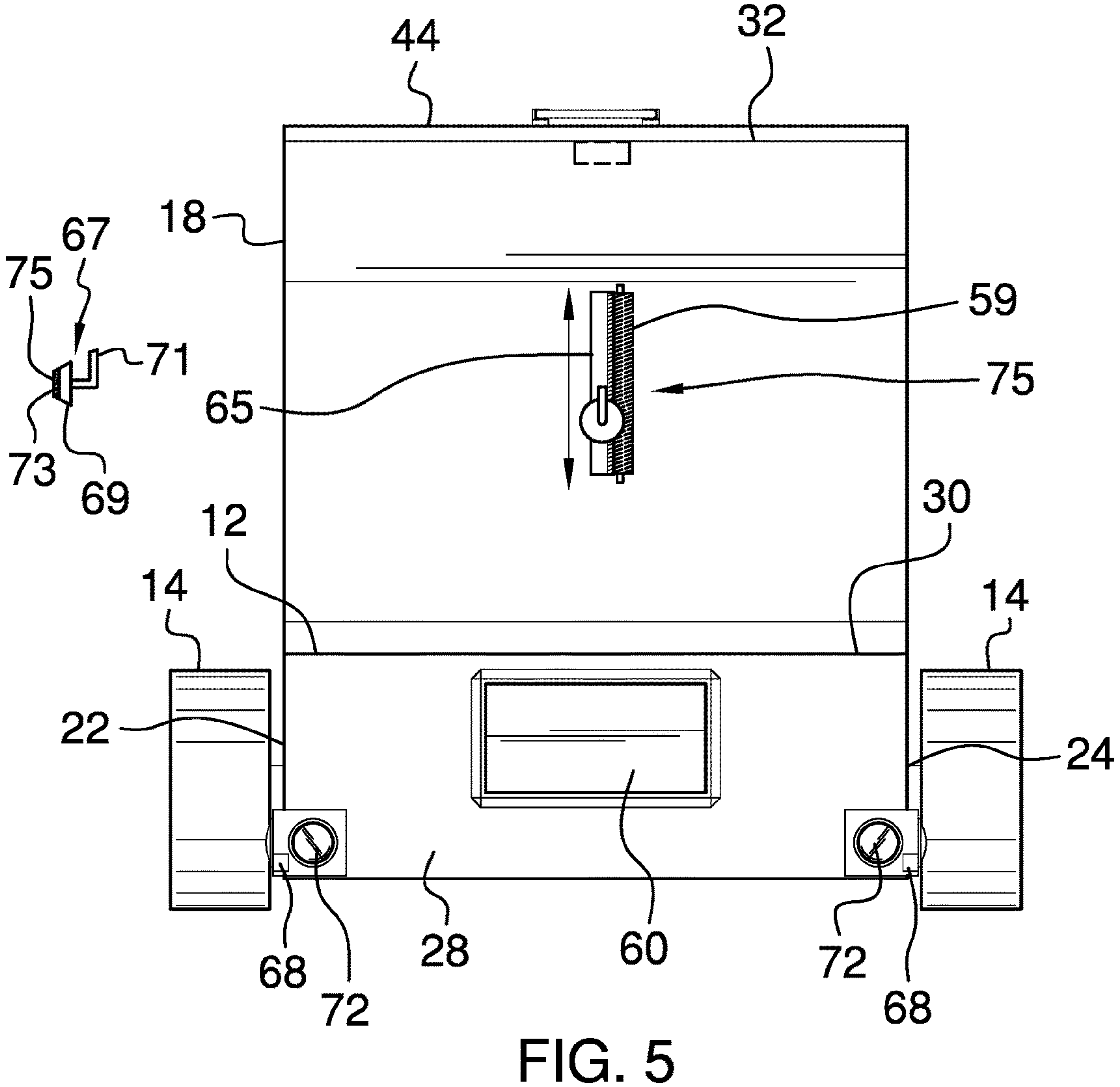
FIG. 5 is a back view of a cart of an embodiment of the disclosure.

With reference now to the drawings, and in particular to FIGS. 1 through 7 thereof, a new guided cart device embodying the principles and concepts of an embodiment of the disclosure and generally designated by the reference numeral 10 will be described.

As best illustrated in FIGS. 1 through 7, the guided trash can cart assembly 10 generally comprises a cart 12 that has a pair of tracks 14 on each side of the cart 12 to drive the cart 12 along a support surface 16. The cart 12 has a dump box 18 that is hingedly integrated into the cart 12 to receive a package delivery 20. The cart 12 has a first lateral wall 22, a second lateral wall 24, a front wall 26, a rear wall 28 and a top side 30. The dump box 18 is positioned on the top side 30 and the dump box 18 has an upper side 32 that is open into an interior of the dump box 18 for receiving the package delivery 20. The dump box 18 has a forward side 34 that is open for dumping the package delivery 20 outwardly from the dump box 18. Additionally, the dump box 18 has a mail slot 36 extending through a lateral wall 38 of the dump box 18 to facilitate mail to be inserted through the mail slot 36.

An environmental unit 40 is provided and the environmental unit 40 is integrated into the dump box 18. The environmental unit 40 is actuatable into a cooling condition for cooling an interior of the dump box 18. In this way the environmental unit 40 can preserve freshness of perishable items in the dump box 18, such as a food delivery. The environmental unit 40 is actuatable into a heating condition for heating the interior of the dump box 18 to warm items in the dump box 18 that must be kept warm. The environmental unit 40 might include an electronic cooler, such as an air conditioning unit and the environmental unit 40 might include an electric heater. As is most clearly shown in FIGS. 1 and 4, the environmental unit 40 might be integrated into the lateral wall 38 of the dump box 18.

A top door 44 is hingedly coupled to the dump box 18 and the top door 44 is positioned on the top side 30 of the dump box 18 for opening and closing the top side 30. In this way the top door 44 facilitates a delivery person to place the package delivery 20 into the dump box 18. A front door 46 is hingedly coupled to the dump box 18 and the front door 46 is positioned on the forward side 34 of the dump box 18. The front door 46 swings into an open position when the dump box 18 is urged into the lifted position to facilitate the package delivery 20 to slide outwardly from the dump box 18. The front door 46 swings into a closed position when the dump box 18 is in the lowered position to inhibit access into the dump box 18. As is most clearly shown in FIG. 3, a handle 47 may be pivotally coupled to the front door 46 for manually opening the front door 46.

A front door lock 48 is provided and the front door lock 48 is integrated into the dump box 18. The front door lock 48 engages the front door 46 when the dump box 18 is in the lowered position for inhibiting the front door 46 from opening. Conversely, the front door lock 48 disengages the front door 46 when the dump box 18 is in the lifted position for facilitating the front door 46 to open. A top door lock 49 is integrated into the dump box 18 and the top door lock 49 engages and disengages the top door 44. An actuator 50 is integrated into the cart 12 and the actuator 50 is in communication with the dump box 18. The actuator 50 lifts the dump box 18 into a dumping position and the actuator 50 lowers the dump box 18 into a lowered position. The actuator 50 extends between the top side 30 of the cart 12 and a bottom wall 52 of the dump box 18. Furthermore, the forward side 34 of the dump box 18 is angled downwardly when the dump box 18 is lifted into the dumping position to dump the package delivery 20 outwardly through the front side. The actuator 50 may comprise an electromechanical linear actuator or other type of actuator 50 that can elongate and shorten.

A pair of driver rollers 52 is each rotatably integrated into a respective one of the first lateral wall 22 and the second lateral wall 24 of the cart 12. Each of the driver rollers 52 includes a motor 54 and the motor 54 associated with each of the driver rollers 52 rotates in a first direction or a second direction. Additionally, the motor 54 associated with each of the driver rollers 52 may comprise an electric motor. A plurality of passive rollers 56 is each rotatably integrated into a respective one of the first lateral wall 22 and the second lateral wall 24 of the cart 12. The plurality of passive rollers 56 is distributed between the front wall 26 and the rear wall 28. Furthermore, each of the tracks 14 extends around a respective one of the driver rollers 52 and respective ones of the passive rollers 56 such that each of the driver rollers 52 urges the tracks 14 to rotate for driving the cart 12.

A control circuit 58 is integrated into the cart 12 and the control circuit 58 is electrically coupled the motor 54 associated with each of the driver rollers 52. The control circuit 58 is electrically coupled to the actuator 50 for actuating the actuator 50 to urge the dump box 18 into the dumping position and the lowered position. Additionally, the control circuit 58 is electrically coupled to the front door lock 48 and the top door lock 49. The control circuit 58 de-actuates the front door lock 48 when the actuator 50 urges the dump box 18 into the dumping position. The control circuit 58 actuates the front door lock 48 when the actuator 50 urges the dump box 18 into the lowered position. The control circuit 58 is electrically coupled to the environmental unit 40 for actuating the environmental unit 40 into either the cooling condition or the heating condition.

An electromagnet 60 is integrated into the cart 12 and the electromagnet 60 is positioned on the rear wall 28 of the cart 12. The electromagnet 60 is electrically coupled to the control circuit 58 and the electromagnet 60 is turned on and off when the control circuit 58 receives a respective engage or disengage command. A transceiver 62 is integrated into the cart 12 and the transceiver 62 is electrically coupled to the control circuit 58. The transceiver 62 is in communication with a global positioning system 64 to communicate directional guidance to the control circuit 58 for guiding the cart 12 along a predetermined route. Additionally, the transceiver 62 is in wireless communication with a personal electronic device 66 for receiving route information from the personal electronic device 66 to facilitate a user to remotely program the cart 12 to perform various activities. The transceiver 62 may comprise a radio frequency transceiver or the like and the transceiver 62 may employ Bluetooth communication protocols.

The personal electronic device 66 may comprise a smart phone or other similar type of electronic device and personal electronic device 66 may store operational software, such as a smart phone app. In this way the user can program routes and schedule times for the cart 12 to travel back and forth along various routes. Thus, the user can program all operational parameters of the cart 12 with respect to where the cart 12 will travel and when the cart 12 will travel there. Additionally, the user can program a safe area for depositing the package delivery 20 when the delivery person deposits the package delivery 20 in the dump box 18. Furthermore, the transceiver 62 can be programmed to communicate with a garage door opener, for example, to facilitate the package delivery 20 to be securely stored in a garage until the user can retrieve the package delivery 20.

A plurality of proximity sensors 68 is each integrated into a respective one of four corners 70 of the cart 12 to sense an object. Each of the proximity sensors 68 is electrically coupled to the control circuit 58 to facilitate the cart 12 to drive around the object when the cart 12 is travelling along the pre-determined route. Each of the proximity sensors 68 may comprise an electronic proximity sensor of any conventional design that has an operational range of approximately 5.0 feet. A plurality of light emitters 72 is each of the light emitters 72 is integrated into a respective one of the four corners of the cart 12 to emit light outwardly from the cart 12. Each of the light emitters 72 is electrically coupled to the control circuit 58 and each of the light emitters 72 is turned on when the cart 12 is in motion to visually alert a bystander that the cart 12 is in motion. Each of the light emitters 72 may comprise a light emitting diode or the like that repeatedly flashes on and off and which emits a red colored light.

A speaker 74 is integrated into the cart 12 to emit audible sounds outwardly from the cart 12 thereby facilitating the speaker 74 to audibly alert the bystander that the cart 12 is in motion. The speaker 74 is electrically coupled to the control circuit 58. Additionally, the speaker 74 may emit spoken words that are received from the personal electronic device 66 such that the user can verbally communicate with the delivery person, for example.

A garbage can 76 is provided for containing garbage. The garbage can 76 has a pair of rollers 78 that is each rotatably integrated into the garbage can 76 to roll along a support surface 16. The garbage can 76 has a front wall 79 and the garbage can 76 may include a lid 80 that is hingedly disposed on the garbage can 76. A plate 82 is integrated into the garbage can 76 and the plate 82 is comprised of a ferromagnetic material. Moreover, the electromagnet 60 abuts the plate 82 when the cart 12 drives next to the garbage can 76 thereby facilitating the electromagnet 60 to magnetically engage the plate 82 when the electromagnet 60 is turned on. In this way the cart 12 can transport the garbage can 76 to a predetermined location. As is most clearly shown in FIG. 6, the plate 82 may be positioned on the front wall 79 of the garbage can 76.

Figure 6:
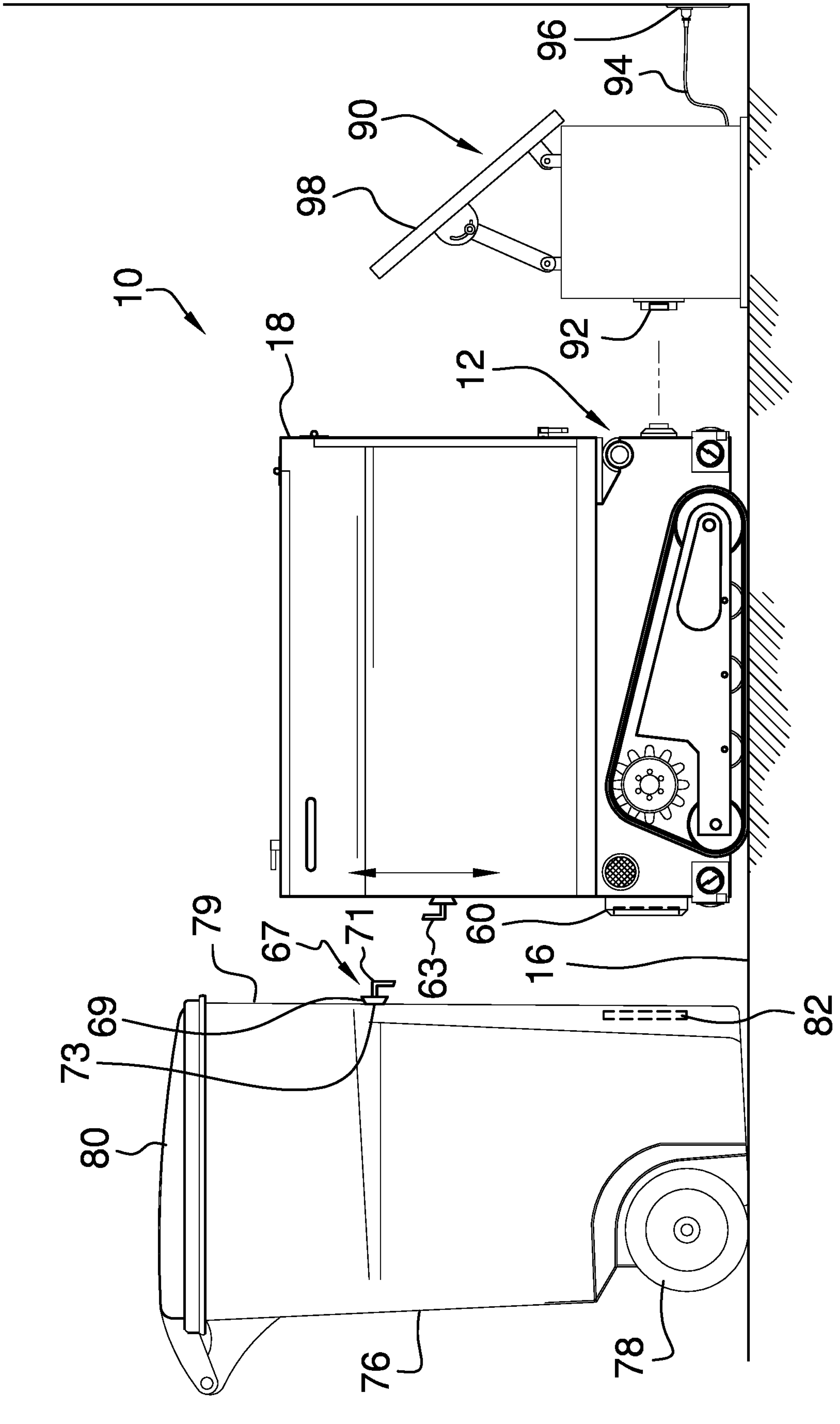
FIG. 6 is a perspective in-use view of an embodiment of the disclosure.
Figure 7:
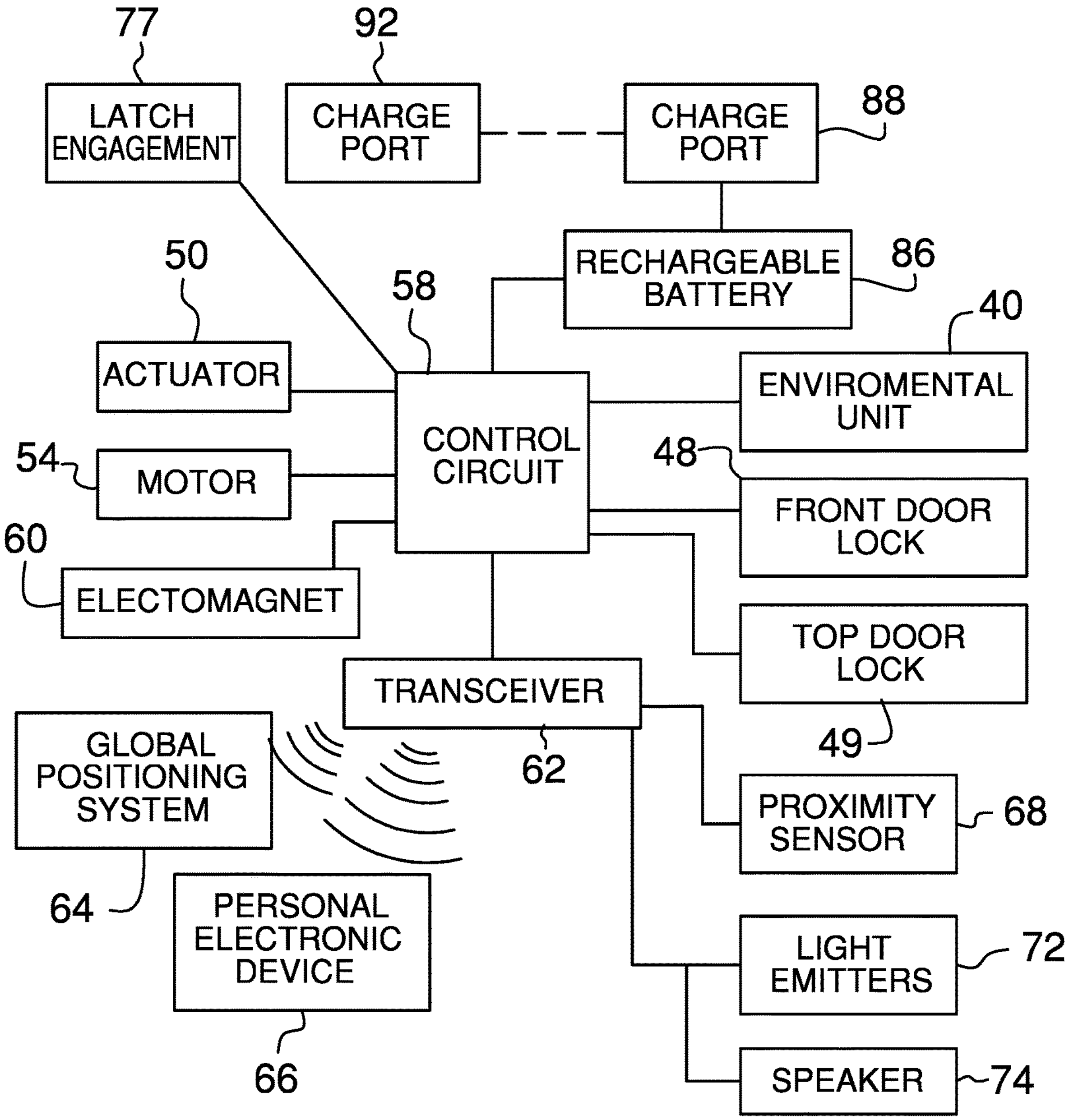
FIG. 7 is a schematic view of an embodiment of the disclosure.

As is most clearly shown in FIG. 6, a latch 67 is provided that includes a panel 69 and a hook 71 extending away from the panel 69. The panel 69 has a distal surface 73 with respect to the hook 71 and the distal surface 73 engages the front wall 79 of the garbage can 76 when the garbage can 76 does not have the plate 82 integrated into the garbage can 76. A latch engagement 75 is integrated into the rear wall 28 of the cart 12 and the latch engagement 75 is electrically coupled to the control circuit 58. The latch engagement 75 is actuated to move up or down to engage or disengage the hook 71 on the latch 67 thereby facilitating the cart 12 to transport the garbage can 76 does not have the plate 82. The latch engagement 75 includes a motor 77 and a screw 59 that is driven by the motor 75. The motor 77 is electrically coupled to the control circuit 58 and the motor 77 may comprise a two direction electric motor or the like. Additionally, the latch engagement 75 includes a leg 61 that engages the screw 59 and a foot 63 extending upwardly from the leg 61. The leg 61 extends outwardly through a slot 65 in the rear wall 28 of the cart 12 and the leg 61 travels upwardly or downwardly along the screw 59 when the motor 77 is rotated in a first direction or a second direction. In this way the foot 63 can engage the hook 71 associated with the latch 67.

A power supply 84 is integrated into the cart 12 and the power supply 84 is electrically coupled to the control circuit 58. The power supply 84 comprises a rechargeable battery 86 that is positioned within the cart 12 and the rechargeable battery 86 is electrically coupled to the control circuit 58. A charge plug 88 is integrated into the front wall 26 of the cart 12 and the charge plug 88 is electrically coupled to the rechargeable battery 86. The charge plug 88 may comprise a male plug that extends away from the front wall 26 of the cart 12.

A charging station 90 is provided and the charging station 90 is positionable in a predetermined location. The cart 12 docks with the charging station 90 for charging the power supply 84. The charging station 90 comprises a charge port 92 that is integrated into the charging station 90. The charge plug 88 on the front wall 26 of the cart 12 is matable to the charge port 92 when the cart 12 docks with the charging station 90. The charge port 92 may comprise a female socket that can insertably receive the charge plug 88.

The charging station 90 includes a power cord 94 that extends away from the charging station 90. The power cord 94 is electrically coupled to the charge port 92. Additionally, the power cord 94 can electrically coupled to a power source 96 for charging the rechargeable battery 86 when the cart 12 is docked with the charging station 90. The power source 96 may be a female electrical outlet or other type of continuous supply of electrical power. The charging station 90 includes a solar panel 98 that is movably integrated into the charging station 90 such that the solar panel 98 is exposed to sunlight. The solar panel 98 is electrically coupled to the charge port 92 for charging the rechargeable battery 86 when the cart 12 is docked with the charging station 90.

In use, the user programs various operational parameters of the cart 12 with the personal electronic device 66, including routes and schedules. In this way the garbage can 76 may be automatically delivered to a curb side, for example, to facilitate garbage collection. Moreover, the transceiver 62 facilitates the cart 12 to be guided with global positioning system 64 coordinates to precisely travel to and from various locations. Additionally, the cart 12 can be programmed to travel to a pre-selected delivery location to facilitate the delivery person to deposit the package delivery 20 into the dump box 18. The cart 12 can subsequently be programmed to transport the package delivery 20 to a secure location to deposit the package delivery 20. Additionally, the environmental unit can be programmed to either cool or heat the interior of the dump box 18 in order to preserve freshness of a perishable delivery that is positioned in the dump box 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A guided trash can cart assembly for transporting a trash can to a predetermined location and also receiving package deliveries, said assembly comprising:

a cart having a pair of tracks on each side of said cart wherein each of said tracks is configured to drive said cart along a support surface, said cart having a dump box being hingedly integrated into said cart wherein said dump box is configured to receive a package delivery;

an actuator being integrated into said cart, said actuator being in communication with said dump box, said actuator lifting said dump box into a dumping position, said actuator lowering said dump box into a lowered position; and a garbage can being configured to contain garbage, said garbage can having a pair of rollers each being rotatably integrated into said garbage can wherein each of said rollers is configured to roll along a support surface, said cart having an engaging element being integrated into said cart for releasably engaging said garbage can thereby facilitating said cart to transport the garbage can;

wherein said cart has a first lateral wall, a second lateral wall, a front wall, a rear wall and a top side, said dump box being positioned on said top side, said dump box having an upper side being open into an interior of said dump box for receiving the package delivery, said dump box having a forward side being open for dumping the package delivery outwardly from said dump box, said dump box having a mail slot extending through a lateral wall of said dump box wherein said mail slot is configured to facilitate mail to be inserted through said mail slot;

wherein a top door being hingedly coupled to said dump box, said top door being positioned on said top side of said dump box for opening and closing said top side wherein said top door is configured to facilitate a delivery person to place the package delivery into said dump box;

wherein a front door being hingedly coupled to said dump box, said front door being positioned on said forward side of said dump box, said front door swinging into an open position when said dump box is urged into said lifted position wherein said front door is configured to facilitate the package delivery to slide outwardly from said dump box, said front door swinging into a closed position when said dump box is in said lowered position wherein said front door is configured to inhibit access into said dump box;

a pair of drive rollers, each of said drive rollers being rotatably integrated into a respective one of said first lateral wall and said second lateral wall of said cart, each of said drive rollers including a motor, said motor associated with each of said drive rollers rotating in a first direction or a second direction;

a plurality of passive rollers, each of said passive rollers being rotatably integrated into a respective one of said first lateral wall and said second lateral wall of said cart, said plurality of passive rollers being distributed between said front wall and said rear wall, each of said tracks extending around a respective one of said drive rollers and respective ones of said passive rollers such that each of said drive rollers urges said tracks to rotate for driving said cart;

a front door lock being integrated into said dump box, said front door lock engaging said front door when said dump box is in said lowered position for inhibiting said front door from opening, said front door lock disengaging said front door when said dump box is in said lifted position for facilitating said front door to open;

a control circuit being integrated into said cart, said control circuit being electrically coupled to said motor associated with each of said drive rollers, said control circuit being electrically coupled to said actuator for actuating said actuator to urge said dump box into said dumping position and said lowered position, said control circuit being electrically coupled to said front door lock, said control circuit de-actuating said front door lock when said actuator urges said dump box into said dumping position, said control circuit actuating said front door lock when said actuator urges said dump box into said lowered position; and wherein said engagement element includes a electromagnet being integrated into said cart, said electromagnet being positioned on said rear wall of said cart, said electromagnet being electrically coupled to said control circuit, said electromagnet being turned on and off when said control circuit receives a respective engage or disengage command.

2. The assembly according to claim 1, wherein said actuator extends between said top side of said cart and a bottom wall of said dump box, said forward side of said dump box being angled downwardly when said dump box is lifted into said dumping position wherein said dump box is configured to dump the package delivery outwardly through said front side.

3. The assembly according to claim 1, further comprising an environmental unit being integrated into said dump box.

4. The assembly according to claim 2, wherein said environmental unit is actuatable into a cooling condition for cooling an interior of said dump box wherein said environmental unit is configured to preserve freshness of perishable items in said dump box.

5. The assembly according to claim 2, wherein said environmental unit is actuatable into a heating condition for heating said interior of said dump box wherein said environmental unit is configured to warm items in said dump box that must be kept warm.

6. The assembly according to claim 3, wherein said environmental unit is actuatable into a cooling condition for cooling an interior of said dump box wherein said environmental unit is configured to preserve freshness of perishable items in said dump box, said environmental unit being actuatable into a heating condition for heating said interior of said dump box wherein said environmental unit is configured to warm items in said dump box that must be kept warm.

7. The assembly according to claim 1, further comprising a transceiver being integrated into said cart, said transceiver being electrically coupled to said control circuit, said transceiver being in communication with a global positioning system wherein said transceiver is configured to communicate directional guidance to said control circuit for guiding said cart along a predetermined route, said transceiver being in wireless communication with a personal electronic device for receiving route information from the personal electronic device wherein said transceiver is configured to facilitate a user to remotely program said cart to perform various activities.

8. The assembly according to claim 1, further comprising a plurality of proximity sensors, each of said proximity sensors being integrated into a respective one of four corners of said cart wherein each of said proximity sensors is configured to sense an object, each of said proximity sensors being electrically coupled to said control circuit wherein said control circuit is configured to facilitate said cart to drive around the object when the cart is travelling along the pre-determined route.

9. The assembly according to claim 1, further comprising a plurality of light emitters, each of said light emitters being integrated into a respective one of said four corners of said cart wherein each of said light emitters is configured to emit light outwardly from said cart, each of said light emitters being electrically coupled to said control circuit, each of said light emitters being turned on when said cart is in motion wherein each of said light emitters is configured to visually alert a bystander that said cart is in motion.

10. The assembly according to claim 1, further comprising a power supply being integrated into said cart, said power supply being electrically coupled to said control circuit, said power supply comprising:

a rechargeable battery being positioned within said cart, said rechargeable battery being electrically coupled to said control circuit; and a charge plug being integrated into said front wall of said cart, said charge plug being electrically coupled to said rechargeable battery.

11. The assembly according to claim 10, further comprising a charging station being positionable in a predetermined location, said cart docking with said charging station for charging said power supply, said charging station comprising:

a charge port being integrated into said charging station, said charge plug on said front wall of said cart being matable to said charge port when said cart docks with said charging station;

a power cord extending away from said charging station, said power cord being electrically coupled to said charge port, said power cord being electrically coupled to a power source for charging said rechargeable battery when said cart is docked with said charging station; and a solar panel being movably integrated into said charging station wherein said solar panel is configured to be exposed to sunlight, said solar panel being electrically coupled to said charge port for charging said rechargeable battery when said cart is docked with said charging station.

12. The assembly according to claim 1, wherein said engagement element includes a plate being integrated into said garbage can, said plate being comprised of a ferromagnetic material, said electromagnet abutting said plate when said cart drives next to said garbage can thereby facilitating said electromagnet to magnetically engage said plate when said electromagnet is turned on thereby facilitating said cart to transport said garbage can to a predetermined location, said plate being positioned on said front wall of said garbage can.

13. A guided trash can cart assembly for transporting a trash can to a predetermined location and also receiving package deliveries, said assembly comprising:

a cart having a pair of tracks on each side of said cart wherein each of said tracks is configured to drive said cart along a support surface, said cart having a dump box being hingedly integrated into said cart wherein said dump box is configured to receive a package delivery, said cart having a first lateral wall, a second lateral wall, a front wall, a rear wall and a top side, said dump box being positioned on said top side, said dump box having an upper side being open into an interior of said dump box for receiving the package delivery, said dump box having a forward side being open for dumping the package delivery outwardly from said dump box, said dump box having a mail slot extending through a lateral wall of said dump box wherein said mail slot is configured to facilitate mail to be inserted through said mail slot;

an environmental unit being integrated into said dump box, said environmental unit being actuatable into a cooling condition for cooling an interior of said dump box wherein said environmental unit is configured to preserve freshness of perishable items in said dump box, said environmental unit being actuatable into a heating condition for heating said interior of said dump box wherein said environmental unit is configured to warm items in said dump box that must be kept warm;

a top door being hingedly coupled to said dump box, said top door being positioned on said top side of said dump box for opening and closing said top side wherein said top door is configured to facilitate a delivery person to place the package delivery into said dump box;

a front door being hingedly coupled to said dump box, said front door being positioned on said forward side of said dump box, said front door swinging into an open position when said dump box is urged into said lifted position wherein said front door is configured to facilitate the package delivery to slide outwardly from said dump box, said front door swinging into a closed position when said dump box is in said lowered position wherein said front door is configured to inhibit access into said dump box;

a front door lock being integrated into said dump box, said front door lock engaging said front door when said dump box is in said lowered position for inhibiting said front door from opening, said front door lock disengaging said front door when said dump box is in said lifted position for facilitating said front door to open;

an actuator being integrated into said cart, said actuator being in communication with said dump box, said actuator lifting said dump box into a dumping position, said actuator lowering said dump box into a lowered position, said actuator extending between said top side of said cart and a bottom wall of said dump box, said forward side of said dump box being angled downwardly when said dump box is lifted into said dumping position wherein said dump box is configured to dump the package delivery outwardly through said front side;

a pair of drive rollers, each of said drive rollers being rotatably integrated into a respective one of said first lateral wall and said second lateral wall of said cart, each of said drive rollers including a motor, said motor associated with each of said drive rollers rotating in a first direction or a second direction;

a plurality of passive rollers, each of said passive rollers being rotatably integrated into a respective one of said first lateral wall and said second lateral wall of said cart, said plurality of passive rollers being distributed between said front wall and said rear wall, each of said tracks extending around a respective one of said drive rollers and respective ones of said passive rollers such that each of said drive rollers urges said tracks to rotate for driving said cart;

a control circuit being integrated into said cart, said control circuit being electrically coupled said motor associated with each of said drive rollers, said control circuit being electrically coupled to said actuator for actuating said actuator to urge said dump box into said dumping position and said lowered position, said control circuit being electrically coupled to said front door lock, said control circuit de-actuating said front door lock when said actuator urges said dump box into said dumping position, said control circuit actuating said front door lock when said actuator urges said dump box into said lowered position, said control circuit being electrically coupled to said environmental unit for actuating said environmental unit into either said cooling condition or said heating condition;

an electromagnet being integrated into said cart, said electromagnet being positioned on said rear wall of said cart, said electromagnet being electrically coupled to said control circuit, said electromagnet being turned on and off when said control circuit receives a respective engage or disengage command;

a transceiver being integrated into said cart, said transceiver being electrically coupled to said control circuit, said transceiver being in communication with a global positioning system wherein said transceiver is configured to communicate directional guidance to said control circuit for guiding said cart along a predetermined route, said transceiver being in wireless communication with a personal electronic device for receiving route information from the personal electronic device wherein said transceiver is configured to facilitate a user to remotely program said cart to perform various activities;

a plurality of proximity sensors, each of said proximity sensors being integrated into a respective one of four corners of said cart wherein each of said proximity sensors is configured to sense an object, each of said proximity sensors being electrically coupled to said control circuit wherein said control circuit is configured to facilitate said cart to drive around the object when the cart is travelling along the pre-determined route;

a plurality of light emitters, each of said light emitters being integrated into a respective one of said four corners of said cart wherein each of said light emitters is configured to emit light outwardly from said cart, each of said light emitters being electrically coupled to said control circuit, each of said light emitters being turned on when said cart is in motion wherein each of said light emitters is configured to visually alert a bystander that said cart is in motion;

a speaker being integrated into said cart wherein said speaker is configured to emit audible sounds outwardly from said cart thereby facilitating said speaker to audibly alert the bystander that said cart is in motion, said speaker being electrically coupled to said control circuit;

a garbage can being configured to contain garbage, said garbage can having a pair of rollers each being rotatably integrated into said garbage can wherein each of said rollers is configured to roll along a support surface, said garbage can having a front wall;

a plate being integrated into said garbage can, said plate being comprised of a ferromagnetic material, said electromagnet abutting said plate when said cart drives next to said garbage can thereby facilitating said electromagnet to magnetically engage said plate when said electromagnet is turned on thereby facilitating said cart to transport said garbage can to a predetermined location, said plate being positioned on said front wall of said garbage can;

a power supply being integrated into said cart, said power supply being electrically coupled to said control circuit, said power supply comprising:

a rechargeable battery being positioned within said cart, said rechargeable battery being electrically coupled to said control circuit; and a charge plug being integrated into said front wall of said cart, said charge plug being electrically coupled to said rechargeable battery; and a charging station being positionable in a predetermined location, said cart docking with said charging station for charging said power supply, said charging station comprising:

a charge port being integrated into said charging station, said charge plug on said front wall of said cart being matable to said charge port when said cart docks with said charging station;

a power cord extending away from said charging station, said power cord being electrically coupled to said charge port, said power cord being electrically coupled to a power source for charging said rechargeable battery when said cart is docked with said charging station; and a solar panel being movably integrated into said charging station wherein said solar panel is configured to be exposed to sunlight, said solar panel being electrically coupled to said charge port for charging said rechargeable battery when said cart is docked with said charging station.

* * * * *